United States Patent [19]

Foscan et al.

[11] Patent Number: 5,441,369
[45] Date of Patent: Aug. 15, 1995

[54] DUPLICATING MACHINE FOR SECURITY KEYS

[76] Inventors: Eros Foscan; Luigi Rossetto, both of Via Podogora, 20, Vittorio Veneto, Italy

[21] Appl. No.: 220,029

[22] Filed: Mar. 30, 1994

[30] Foreign Application Priority Data

Jul. 29, 1993 [IT] Italy .............................. VE93A0022

[51] Int. Cl.6 .............................................. B23C 3/35
[52] U.S. Cl. ........................................ 409/81; 76/110
[58] Field of Search ................ 409/81, 82, 83; 76/110

[56] References Cited

U.S. PATENT DOCUMENTS

| 4,051,748 | 10/1977 | Sherman | 409/81 |
| 4,657,448 | 4/1987 | Alexander | 409/81 |
| 4,969,782 | 11/1990 | Castain | 409/81 |

Primary Examiner—Daniel W. Howell
Attorney, Agent, or Firm—Hoffman, Wasson & Gitler

[57] ABSTRACT

A code-duplicating machine for security keys usable in cylinder locks with a bolt operable by a plug and with a plurality of pins operable axially and rotataby by a cut key inserted into said plug to release it and enable it to rotate. The machine comprises a cutter (6), a clamp (14) for a key (8) to be cut, and means for causing said clamp (14) and said cutter (6) to undergo mutual movement resulting in said key being cut in accordance with a predetermined code.

16 Claims, 2 Drawing Sheets

DUPLICATING MACHINE FOR SECURITY KEYS

FIELD OF THE INVENTION

This invention relates to a duplicating machine for security keys and more particularly for keys for use in security cylinder locks of MEDECO ™ type.

BACKGROUND OF THE INVENTION

The general principle of operation of cylinder locks is known. In these, the bolt is usually operated by a cylinder (or plug) rotated within a corresponding cylindrical seat provided in the lock body. The cylinder is rotated by a cut key previously inserted into it, and is made possible by correctly arranging a plurality of pins housed partly in radial seats provided in the plug and partly in the extension of said seats provided in the cylindrical cavity housing it. As each pin is divided into two parts, the plug can be rotated only if the separation surface between the two parts of each pin coincides with the surface of discontinuity between the plug and relative seat. This state is achieved by correct cutting of the key which is inserted into the plug, to release it before rotating it.

The degree of reliability of a lock of this type corresponds to the number of variable factors which participate in forming that "combination" which enables the lock to be operated, and in particular the cross-section of the key and of the corresponding insertion seat in the plug, the number of pins and the number of positions which each pin can assume.

The possibility of finding two different locks operable by the same key is currently very remote, and hence the degree of reliability of such security locks is fairly high. However a wrongdoer expert in security locks can insert special tools into the opening in the plug and position the various pins in the same manner in which they would be positioned by the corresponding cut key, to hence succeed in rotating the key.

In order to prevent this tampering a security lock has been proposed in which the plug can be rotated only if the various pins are correctly positioned both axially and rotationally, in such a manner as to deactivate a special rake element which in addition to the pins also prevents the plug rotating within its seat.

In this known type of lock, known as a MEDECO ™ lock, the notches are cut in the key by a cutter which instead of being positioned only perpendicular to the key to be cut can also be positioned inclined by ±20° to the horizontal, and hence able to form inclined notches in the key. If in addition that end of the pins in contact with the key is of dihedron shape, inserting the key into the plug results not only in axial displacement but also rotation of the pins, corresponding to the inclination of the notches present in said key.

In this manner the double result is obtained of increasing the number of variable parameters which define a lock, and of making it practically impossible to operate the pins from the outside, so substantially increasing the degree of reliability of the lock.

In order to define the cutting code for the key, there is associated with the code defining the axial position of each pin a letter which can either be C (in the case of a perpendicular cut—Central), or R (in the case of a cut rotated through 20° clockwise—Right), or L (in the case of a cut rotated through 20° anticlockwise—Left).

In order to still further increase the number of variable parameters in a MEDECO ™ lock, it has been proposed to also vary the shape of the wedge-shaped end of each pin, in the sense that besides being of symmetrical dihedron shape it can also be of asymmetrical dihedron shape with the sharp edge either forward or rearward of its position on the pin axis. The three forward positions are conventionally indicated by a letter, namely K, B or Q, preceding the letter identifying the three corresponding centered positions by one place, whereas the three rearward positions are conventionally indicated by a letter, namely M, D or S, following the letter identifying the three centered positions by one place.

The aforedescribed MEDECO ™ locks have a very high degree of reliability, however they suffer from a serious problem relating to code-cutting the relative key, ie cutting keys from the identifying code for each pin of the corresponding key. In this respect, each notch key has to be cut with a cutter which not only forms the notch in the key to the required depth but also takes account of the particular shape of the pin, ie it must be able to be positioned perpendicular to the key axis or rotated through 20° or −20° from it, and must also be able to be shifted axially along the key shank by an amount corresponding to the particular asymmetry of the tip of the pin.

Machines currently exist for code-cutting (ie without using a key to be duplicated but knowing only the cutting code), both for MEDECO ™ keys with a symmetrical wedge pin and for MEDECO ™ keys with an asymmetrical wedge pin, but there are no machines able both to cut keys of one type, and to cut keys of the other type.

In addition, in known code-duplicating machines for MEDECO ™ keys, the cutting involves a series of difficult, slow and non-instinctive operations, which are therefore subject to error.

Again in these known machines the key to be cut is generally positioned with that edge to be cut facing upwards with the cutter descending vertically onto it, to hence create a notch the cut of which is not perfectly rectilinear but instead is curved in accordance with the radius of the cutter. The result is that the engagement between the notch and relative pin is not perfect.

Finally, known duplicating machines for MEDECO ™ keys have all their members accessible from the outside and hence subject to inevitable errors due to the presence and accumulation of swarf originating during cutting.

SUMMARY OF THE INVENTION

The main object of the invention is to cut security keys for MEDECO ™ locks with both symmetrical and asymmetrical pins.

A further object of the invention is to code-cut MEDECO ™ keys in a rigorously precise and repeatable manner.

A further object of the invention is to effect this cutting in very simple and fast manner.

A further object of the invention is to enable this cutting to be effected by non-specialized personnel.

These and further objects which will be apparent from the description given hereinafter are attained according to the invention by a duplicating machine for security keys and more particularly for keys for use in security cylinder locks of MEDECO ™ type.

BRIEF DESCRIPTION OF THE DRAWINGS

A preferred embodiment of the present invention is further clarified hereinafter by way of non-limiting example with reference to the accompanying drawings, in which.

DETAILED DESCRIPTION OF THE PREFERRED EMBODIMENT

Figure 1:
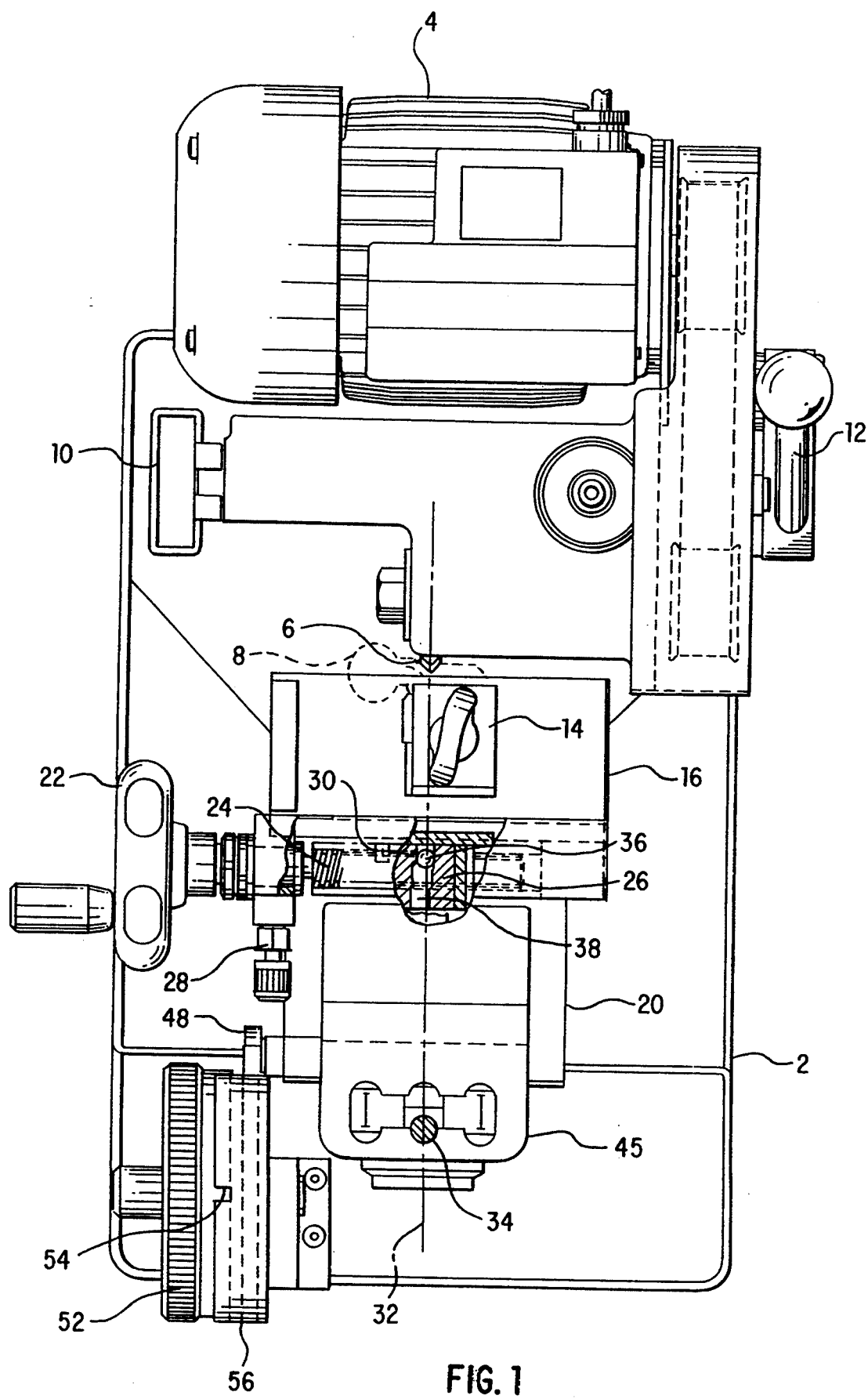
FIG. 1 is partly sectional plan view of a duplicating machine according to the invention.
Figure 2:
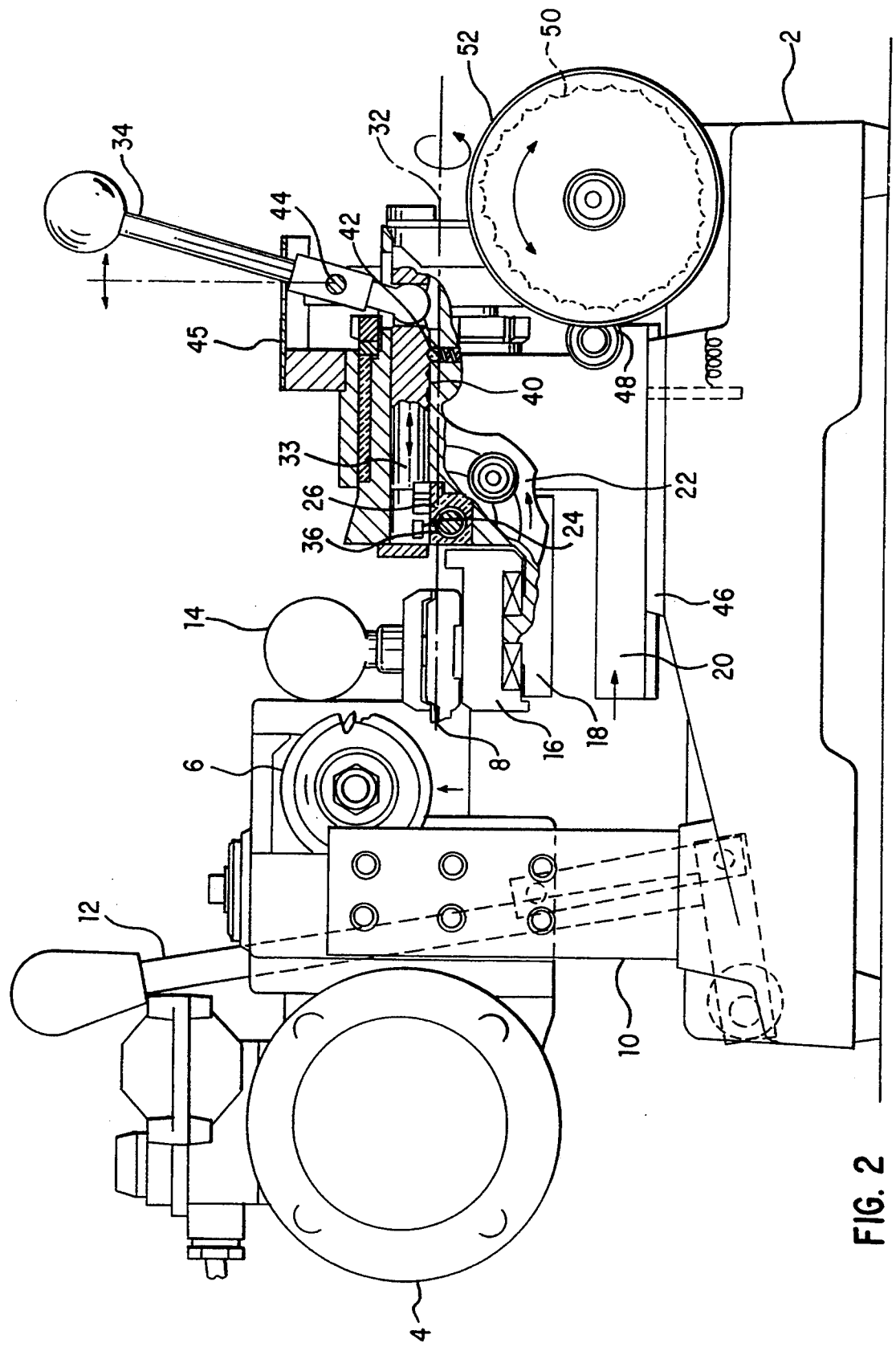
FIG. 2 is a partly sectional side view thereof.

The duplicating machine according to the invention comprises on a base 2 a motor 4 which via a belt transmission system drives a cutter 6 for cutting a key 8. The unit comprising the motor 4, belt transmission system and cutter 6 is slidable vertically along two guides 10, its vertical movements being controlled by a lever 12.

The duplicating machine is also provided with a clamp 14 the purpose of which is to maintain the key 8 in a position facing the cutter 6. The clamp 14 is mounted on a first slide 16 slidable parallel to the axis of the key 8 on an underlying rockable support 18. The rockable support 18 is mounted on a slide 20 slidable horizontally on the base 2 in a direction perpendicular to the axis of the cutter 6.

The slide 16 is moved along the rockable support 18 by a handwheel 22, mounted on the rockable support 18 and provided with a threaded shaft 24 engaging in a threaded bush 26 rigid with the rockable support 18. This movement, which by its nature should be continuous, takes place in reality in steps because of the presence of a spring device 28 which snap-halts the handwheel 22 at each revolution to preferentially position the key 8 relative to the cutter 6 in those positions in which the notches are to be cut. These positions are expressly displayed by a number which appears through an aperture 30 provided in the rockable support 18.

The rockable support 18 is mounted on the slide 20 such as to be able to rotate on it about a horizontal axis 32 lying in the vertical plane of the cutter 6 and perpendicular to the axis of the key. 8. The rockable support 18 is provided with a cylindrical seat having its axis positioned above the axis of rotation 32 and parallel to it. This seat houses a cylindrical bar 33 which can move axially under the control of a lever 34, the lower end of which engages in a cavity provided in the bar.

Said bar 33 is provided at one end with a peg 36 engaging in a slotted guide 38, visible in FIG. 1 and formed in three parts which are parallel to the axis 32 and are slightly displaced from each other in the horizontal plane by a distance corresponding to the axial offset of the end of the three different types of pin of the security lock.

The cylindrical bar 33 comprises three longitudinally aligned notches elastically engagable by a ball 42 constrained to the seat of the bar so as to predetermine the three positions which this is able to assume by operating the lever 34 and corresponding to the engagement of the peg 36 in three portions of the slotted guide 38.

The lever 34 is pivoted on a pin 44 rigid with the rockable support 18 and can hence be made to rotate about this latter to generate the axial movements of the bar 33 as stated. At the same time the lever can be operated in a transverse direction perpendicular to the preceding, to cause the support 18 to rock in the two directions about the axis 32.

These overall movements of the lever 34 are guided and displayed by a template 45 rigid with the machine base 2.

The movements of the slide 20 along the machine base 2 are enabled by the engagement of said slide in guides 46 provided in said base and are generated by the counteraction between the lateral surface of a roller 48 rigid with the slide and a multi-lobed wheel 50 rigid with a control knob 52 applied to the base.

More specifically, the wheel 50 comprises on its lateral surface a plurality of concave lobes all of the same radius, equal to that of the roller 48, and a spring, not visible on the drawings, urged by the slide 22 to maintain said roller 48 elastically adhering to one of the lobes of the wheel 50. The distance of each of said lobes from the axis of rotation of the wheel 50 is determined in such a manner as to position the key 8 with respect to the cutter 6 to correspond to the different depths required for the cut notches.

The angular position of the knob 52 and hence of the multi-lobed wheel 50 is indicated by a number through an aperture 54 provided in a fixed cover 56 embracing said knob 52.

The operation of the duplicating machine according to the invention is as follows:

the blank key 8 to be cut is firstly mounted in the clamp 14 in such a manner as to respect the traditional location points for correct cutting. The handwheel 22 is then operated until the number corresponding to the first notch to be cut appears in the aperture 30. The machine is set such that when the lever 34 is in the central position of the aperture provided in the guide template 45 (position C), the vertical plane of the cutter 6 coincides with the plane in which the first notch is to be cut in the key 8.

If this notch is to be perfectly perpendicular to the key and has to correspond to a symmetrical lock pin, the lever 34 is maintained in this position so that on operating the lever 12, the cutter is lowered and acts on the key 8 to form therein a notch having a depth related to the position of the control knob 52. It is apparent that to set the depth of said notch the knob 52 is firstly operated so as to vary the position of the key 8 relative to the cutter 6 in the horizontal plane and hence the depth of the notch, in accordance with the chosen lobe of the wheel 50 as displayed through the aperture 54.

If however the notch to be cut is again perpendicular to the axis of the key 8 but is to be provided for engaging as asymmetrical pin (coded D or B instead of C), the lever 34 has to be moved forwards or backwards before operating the lever 12. In this manner the bar 33 is moved axially and, by virtue of the engagement of its peg 36 in the slot 38, displaces the threaded bush 26 to the right or left relative to the rockable support 18 by a small distance related to the asymmetry of the lock pin.

Clearly, the axial displacement of the threaded bush 26 results in a like displacement of the threaded shaft 24, of the slide 16, of the clamp 14 and of the key 8. In FIG. 1 the control lever 34 is shown in position B.

If instead a notch inclined for example in the anticlockwise direction is required, before operating the lever 12, the lever 34 is moved towards the left (position L) to rotate the rockable support 18 and hence the key 8 about the axis 32. The subsequent operation of the lever 12 then results in the formation of the inclined notch in the key 8.

If the cut notch, in addition to being inclined, also has to be arranged for engagement by an asymmetrical pin, the lever 34 has to be shifted both towards the left and forwards (position M) or backwards (position K).

The commands to be used for the key cutting are basically as follows:

the handwheel 22 is operated to axially move the key to position it for effecting the successive notches, the knob 52 is operated to adjust the depth of each notch, the lever 34 is operated in a direction parallel to the key axis to set the notch angle (perpendicular, or rotated through 20° anticlockwise, or rotated through 20° clockwise), the lever 34 is operated in a direction perpendicular to the key axis to form the notch in relation to the type of pin which is to interact with it (symmetrical pin or asymmetrical pin with its end displaced towards the head of the key, or asymmetrical with its end displaced towards the tip of the key).

From the aforegoing it is apparent that the duplicating machine according to the invention completely attains the stated objects, and in particular:

it enables any key of MEDECO TM type to be code-cut in rigorously precise form, it allows very fast and simple cutting, with instinctive operations, it can be used by non-specialized personnel, it enables the resultant notches to present a perfectly rectilinear cut.

Although the present invention has been shown and described with respect to a preferred embodiment thereof, it should be understood by those skilled in the art that other various changes in the form and detail thereof may be made without departing from the spirit and scope of this invention.

We claim:

1. A code-duplicating machine for security keys usable in cylinder locks with a bolt operable by a plug and with a plurality of pins operable axially and rotataby by a cut key inserted into said plug to release it and enable it to rotate, said duplicating machine comprising a cutter, a clamp for a key to be cut, and means for causing said clamp and said cutter to undergo mutual movement resulting in said key being cut in accordance with a predetermined code, characterised in that:

a first slide is mounted in a base in a manner slidable parallel to the plane of said cutter, a support is mounted on said first slide in a manner rockable about an axis contained within the plane of the cutter and perpendicular to the axis of the key, a second slide is mounted on said rockable support in a manner slidable parallel to the axis of the key, the clamp for retaining said key is mounted on said second slide, first control means are provided for generating movements of said first slide relative to said base in conformity with the depth of a given notch to be cut, second control means are provided for generating movements of said second slide relative to said rockable support in conformity with the position of that given notch to be cut, a control member is associated with said rockable support to generate its rotation movements about said axis in conformity with the inclination of that given notch to be cut with respect to the axis of the key, and to generate traversing movements of said second slide parallel to the key axis in conformity with the type of lock pin associated with that given notch to be cut.

2. A machine as claimed in claim 1, wherein the cutter is movable along its containing plane relative to the key clamped in its clamp.

3. A machine as claimed in claim 1, wherein the cutter is mounted on a structure movable along guides rigid with the base and is associated with means for generating its movements along said guides.

4. A machine as claimed in claim 3, wherein between the base and the support structure for the cutter there is interposed a lever for moving said structure along said guides.

5. A machine as claimed in claim 1, wherein with the base there is associated a rotatable knob provided with indentations cooperating with a counteracting member to define the position of said first slide relative to said base.

6. A machine as claimed in claim 5, wherein the first slide is provided with a roller and a spring for maintaining said slide with said roller elastically adhering to a wheel rotationally rigid with said knob and comprising on its circumference a plurality of concave lobes complementary to said roller and spaced from the axis of rotation of said wheel in conformity with the predetermined depths of the notches to be cut.

7. A machine as claimed in claim 6, wherein the rotatable knob is provided with an indication system by which the position of the lobe engaged by said roller is associated with a mark which is visible from the outside and identifies the depth of the notch to be cut which corresponds with that lobe.

8. A machine as claimed in claim 1, wherein on said second slide there is mounted a threaded shaft operated by a handwheel and engaged in a threaded bush rigid with the rockable support.

9. A machine as claimed in claim 8, wherein with the unit comprising the threaded shaft and its operating handwheel there is associated a member acting in the sense of snap-maintaining the angular position of said threaded shaft such as to correspond to the position of the various notches to be cut.

10. A machine as claimed in claim 9, wherein the thread pitch of the shaft is equal to the distance between the notches to be cut.

11. A machine as claimed in claim 1, wherein the rockable support is provided with a bar parallel to the rocking axis and axially movable with its seat formed in said rockable support, to said bar there being applied a peg engaging in a slotted guide acting in the sense of transforming the axial movements of said bar into movements of the clamp parallel to the axis of the key.

12. A machine as claimed in claim 1, wherein on said second slide there is mounted a threaded shaft operated by a handwheel and engaged in a threaded bush rigid with said rockable support, said rockable support being provided with a bar parallel to the rocking axis and axially moveable with its seat formed in said rockable support, said bar having a peg engaging in a slotted guide provided in said threaded bush and acting to transform the axial movements of said bar into movements of said clamp parallel to the axis of said key.

13. A machine as claimed in claim 11, wherein the slotted guide comprises three parallel rectilinear portions which are connected together but are mutually offset by an amount corresponding to the possible types of the lock pins cooperating with each notch to be cut.

14. A machine as claimed in claim 11, wherein the bar comprises three cavities cooperating with an elastic member to snap-define the axial positions of said bar in which its peg engages the three different rectilinear portions of said slotted guide.

15. A machine as claimed in claim 11, wherein to the bar there is hinged a control lever which lies in a plane passing through the rocking axis of the support and is pivoted on a pin perpendicular to but not passing through said axis.

16. A machine as claimed in claim 15, wherein with the machine base there is associated a template for displaying the movements of the lever, both relative to the rockable support about the pin, and together with the rockable support about the axis.

* * * * *